United States Patent [19]

Van Heyningen et al.

[11] Patent Number: 4,949,117
[45] Date of Patent: Aug. 14, 1990

[54] CAMERA

[75] Inventors: Roger S. Van Heyningen, Rochester; Cynthia S. Bell, Webster; Paul L. Ruben, Penfield, all of N.Y.

[73] Assignee: Eastman Kodak Company, Rochester, N.Y.

[21] Appl. No.: 288,887

[22] Filed: Dec. 23, 1988

[51] Int. Cl.[5] .................................................. G03B 7/00
[52] U.S. Cl. ..................................... 354/412; 358/224; 354/75
[58] Field of Search ............... 354/412, 413, 416, 417, 354/429, 432, 402, 75, 76, 219; 358/225, 226, 909, 224

[56] References Cited

U.S. PATENT DOCUMENTS

| | | | |
|---|---|---|---|
| 3,714,442 | 1/1973 | Frank | 250/209 |
| 4,303,322 | 12/1981 | Someya | 354/31 |
| 4,330,797 | 5/1982 | Yokokawa et al. | 358/224 |
| 4,420,773 | 12/1983 | Toyoda et al. | 358/335 |
| 4,571,627 | 2/1986 | Stempeck | 358/224 |
| 4,694,151 | 9/1987 | Yoshimura | 354/402 |
| 4,714,962 | 12/1987 | Levine | 358/209 |
| 4,716,470 | 12/1987 | Levine | 358/256 |
| 4,717,959 | 1/1988 | Isago | 354/402 |
| 4,738,526 | 4/1988 | Larish | 354/412 |
| 4,742,369 | 5/1988 | Ishii et al. | 354/441 |
| 4,763,146 | 8/1988 | Niikura | 354/75 |
| 4,785,323 | 11/1988 | Bell | 354/443 |

Primary Examiner—Russell E. Adams
Attorney, Agent, or Firm—Donald D. Schaper

[57] ABSTRACT

A camera is disclosed which includes elements for recording an image on photographic film and a solid-state image sensor for recording an electronic image. In order to reduce the size and complexity of the camera and to improve the camera performance, the electronic and film recording functions of the camera are integrated. The solid-state image sensor is used both in controlling the recording of an image on film and in producing an electronic image.

10 Claims, 5 Drawing Sheets

CAMERA

BACKGROUND OF THE INVENTION

1. Field of the Invention

The present invention relates to a camera, and more particularly, to a camera which includes means for forming an image on photographic film and means for producing an electronic image.

2. Description of the Prior Art

Various cameras are known which record an image on photographic film and also record an image electronically. Generally, these cameras include conventional optics and film handling mechanisms for forming an image on film, and they also include a solid-state imager and a display for forming and viewing the electronic image. Such a camera can be used in a preview mode in which a photographer can view an electronically-recorded scene on the display without having to expose the film. The preview mode makes it convenient to arrange the composition and verify the exposure level before a permanent image is captured on film. The camera can also operate in a review mode in which the photographer can view an image on the display which has also been captured on film. An important benefit of the review mode is that it adds the capability to evaluate pictures before leaving a scene, including the evaluation of such photographic variables as composition, flash synchronization, camera and subject motion, exposure level, and depth of field. This review capability is of particular value for functions, such as weddings, where it is important to know that a certain scene has been properly recorded.

U.S. Pat. No. 4,742,369, discloses an electronic still camera which is adapted to form an image on a photosensitive film and on a solid-state imaging element in response to the actuation of a shutter switch. The camera can form the images on the film and sensor simultaneously or in sequence. The camera elements for forming the image on the photosensitive film are conventional camera elements found in a single lens reflex camera. The shutter speed and desired lens aperture are manually controlled by the operator. A beam splitter in the camera directs light from the optical system to a solid-state imager. A disadvantage of the camera shown in this patent, as well as other known prior-art cameras, is that the camera includes essentially two different systems to record the electronic image and to control the recording of the photographic image. This arrangement makes the camera complex and expensive to manufacture.

SUMMARY OF THE INVENTION

It is an object of the present invention to overcome the problems in the prior art described above and to provide an improved camera which is particularly suitable for recording an image on photosensitive film and on an electronic device.

In accordance with one aspect of the present invention, there is provided a camera comprising means for forming an image on photographic film; and means for producing an electronic image signal, the producing means including means for sensing scene parameters and for controlling the forming means in accordance with values of the parameters.

In one embodiment of the present invention, a camera of the single lens reflex type includes an optical means for directing an image onto photographic film or into a viewfinder, depending on the position of a movable mirror. Located in the lens of the camera is a beam splitter which directs a portion of the light entering the camera onto a solid-state image sensor. The image data from the sensor is written into memory, and the data can be retrieved from memory to drive a display located in the viewfinder of the camera. In addition to producing an electronic image signal which can be used to verify the image recorded on film, the solid-state sensor is also used to perform other functions in the camera such as exposure control and autofocus.

The main advantages of the camera of the present invention over known cameras which record electronically and on film are the improved performance and the reduction in size and complexity of the camera. These advantages are achieved as a result of integrating the electronic recording and the film recording functions in the camera. The solid-state sensor is used not only to capture an electronic representation of the image for storage and subsequent display but also to sense image information for use in the autofocus and exposure control mechanisms of the photographic camera.

Other features and advantages will become apparent upon reference to the following Description of the Preferred Embodiment when read in light of the attached drawings.

DESCRIPTION OF THE PREFERRED EMBODIMENT

Figure 1:
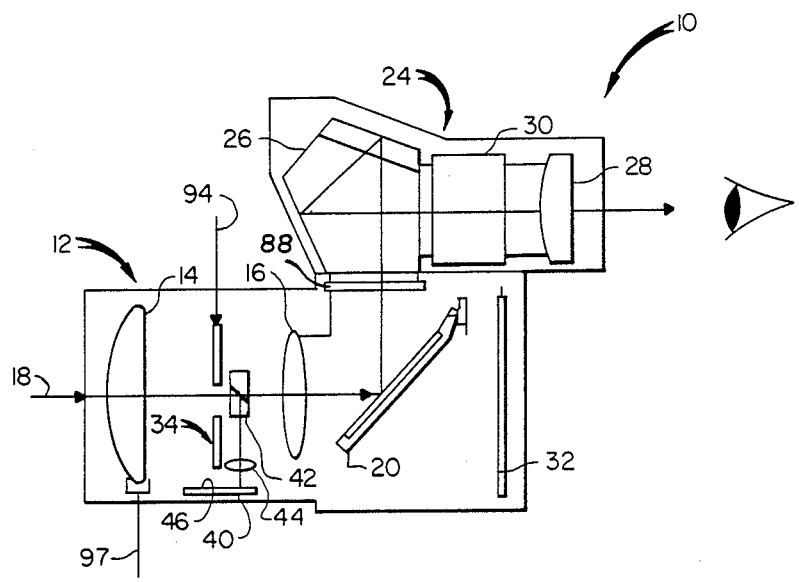
FIG. 1 is a schematic elevational view of the camera of the present invention.
Figure 2:
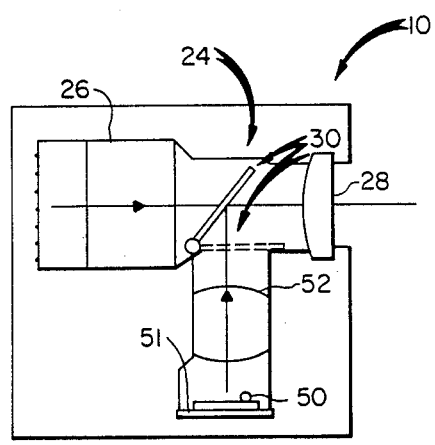
FIG. 2 is a top plan view of the camera shown in FIG. 1, showing the display and the viewfinder.

With reference to FIGS. 1 and 2, there is shown a schematic representation of the camera of the present invention. As shown in these figures, a camera 10 comprises an imaging lens 12 having elements 14 and 16 which are disposed along an optical axis 18. Light from an object propagates along axis 18 and is reflected onto a ground glass viewing screen 88 by a mirror 20 which is inclined at a 45° angle. An image on screen 88 can be viewed through a viewfinder 24 and a roof penta prism 26. Viewfinder 24 includes an eyepiece 28 and a mirror 30 which is movable between the solid line position, shown in FIG. 2, and the position shown therein in phantom. When a desired scene is framed in the viewfinder, mirror 20 is pivoted upwardly to a generally horizontal position (not shown) to expose the film 32. The exposure of the film 32 is controlled by a combination diaphragm/shutter indicated schematically at 34.

An electronic image can be recorded in camera 10 through the use of a solid-state image sensor 40 which receives light from a beam splitter 42 located along the optical axis 18. Light from beam splitter 42 is focused on image sensor 40 by means of a lens 44. Beam splitter 42 can be, for example, a so-called 80/20 beam splitter which is adapted to transmit about 80% of the light to film 32 and about 20% of the light to image sensor 40. When the light is divided in this manner, it will be apparent that the ASA ratings of the film 32 and the image sensor 40 must be adjusted accordingly in order to obtain the proper exposure on both the sensor and the film.

A driver 46 for image sensor 40 is located adjacent the sensor 40. Image sensor 40 includes a plurality of sensor elements each of which generates a signal in proportion to the amount of luminous energy that impinges thereon. The processing and storage of the signal from sensor 40 will be explained hereinafter. A recorded image can be displayed on a display 50, shown in FIG. 2. Display 50 is preferably a liquid crystal display; however, other types of displays can be used. One example of a suitable display is a Seiko-Epson liquid crystal display, Part. No. EVFM0000-1. A backlight 51 is provided for display 50. Backlight 51 can be, for example, a CAPSUL series EL panel backlight, sold by Luminescent Systems, Inc. An image on display 50 passes through a focusing lens 52, is reflected by mirror 30, and can be viewed through eyepiece 28.

Figure 3:
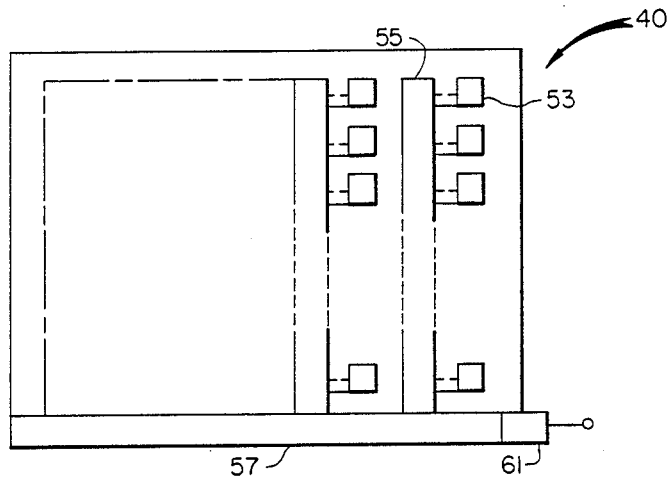
FIG. 3 is a schematic plan view of the image sensor used in the present invention.

The image sensor 40 for camera 10 can be of a type which uses a charge-coupled device (CCD), for example, an interline CCD image sensor, No. KAI-0280, manufactured by the Eastman Kodak Co., Rochester, N.Y. The KAI-0280 image sensor uses photodiodes as the image sensing elements. A schematic illustration of image sensor 40 is shown in FIG. 3. An image is captured in sensor 40 through the conversion of incident light into charge which is collected in photodiodes 53. The amount of charge collected is proportional to light intensity and exposure time. The collected charge is transported from the photodiodes 53 to a vertical CCD shift register 55 where it is shifted to a horizontal CCD shift register 57. The horizontal CCD shift register 57 shifts the charge to an output section 61 which includes a floating diffusion and a charge-to-voltage converter.

Figure 4:
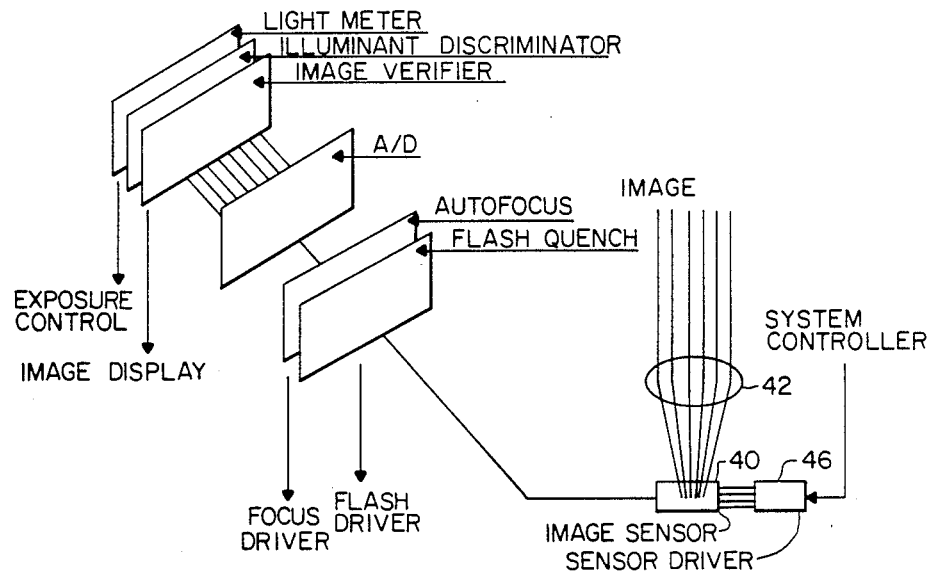
FIG. 4 is a schematic illustration of the various functions which are performed by the image sensor in the camera.

An important feature of the camera of the present invention is the integration of the electronic camera functions and photographic film camera functions. This is accomplished through the use of image sensor 40, not only to record an electronic image, but also to perform a number of functions in the recording of an image on film. The use of image sensor 40 in this manner is illustrated schematically in FIG. 4. A signal from image sensor 40 can be used to perform flash quench and autofocus; and after passing through an A/D converter, the digitized signal can be used for image verification and in an illuminant discriminator and a light meter for exposure control.

Figure 5:
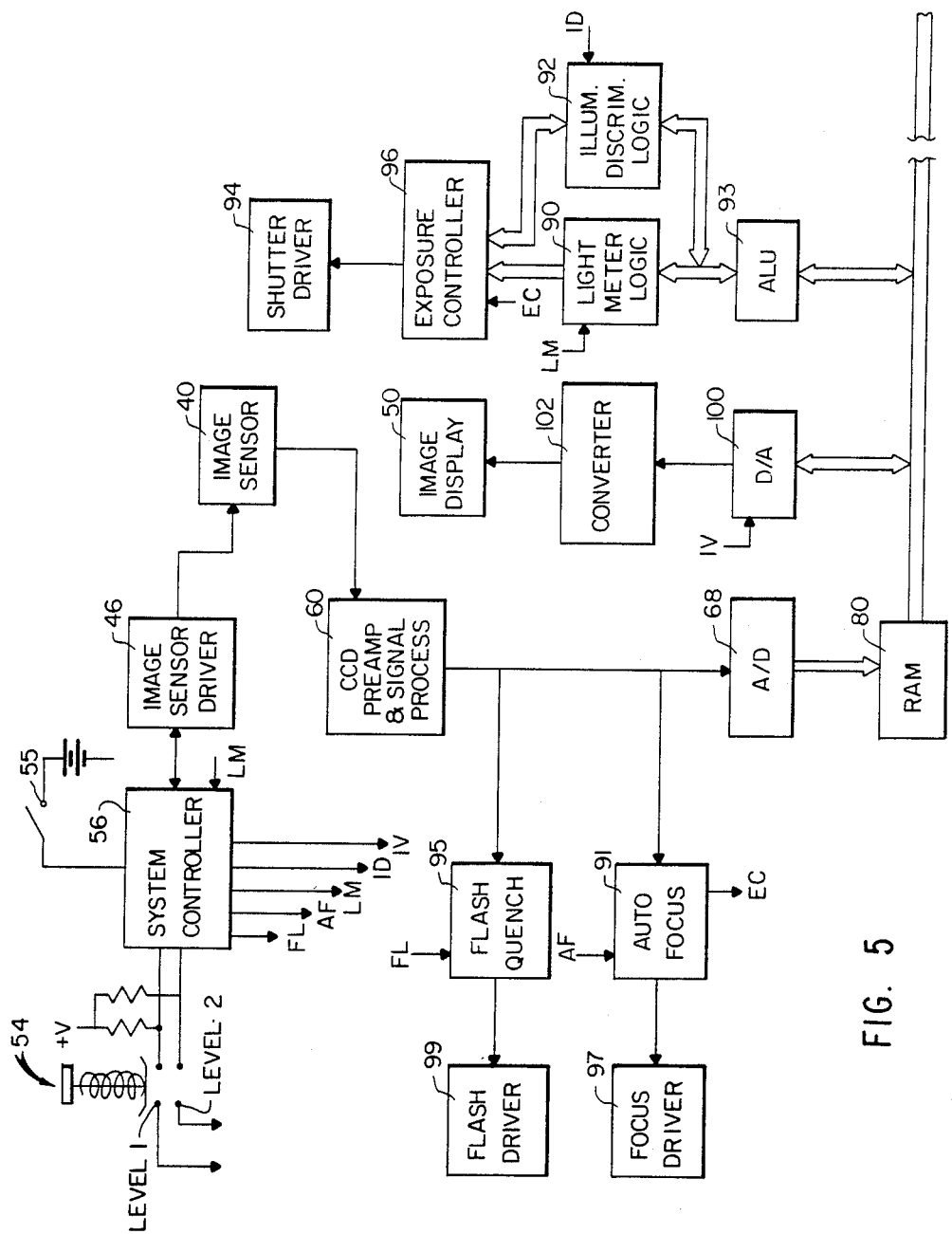
FIG. 5 is a block diagram of the electronic elements of the camera.
Figure 7A:
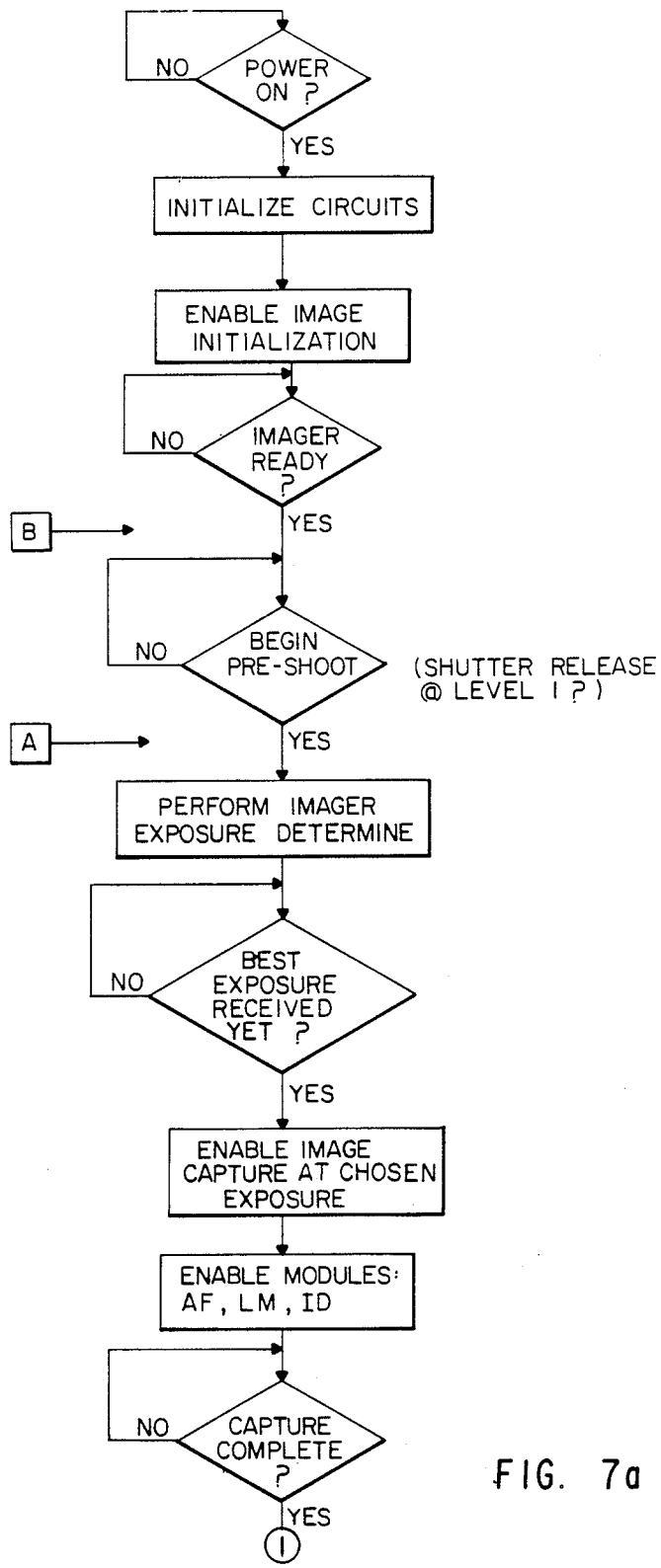
FIGS. 7a and 7b show a flow chart of the sequence of events in recording an image electronically and on film.
Figure 7B:
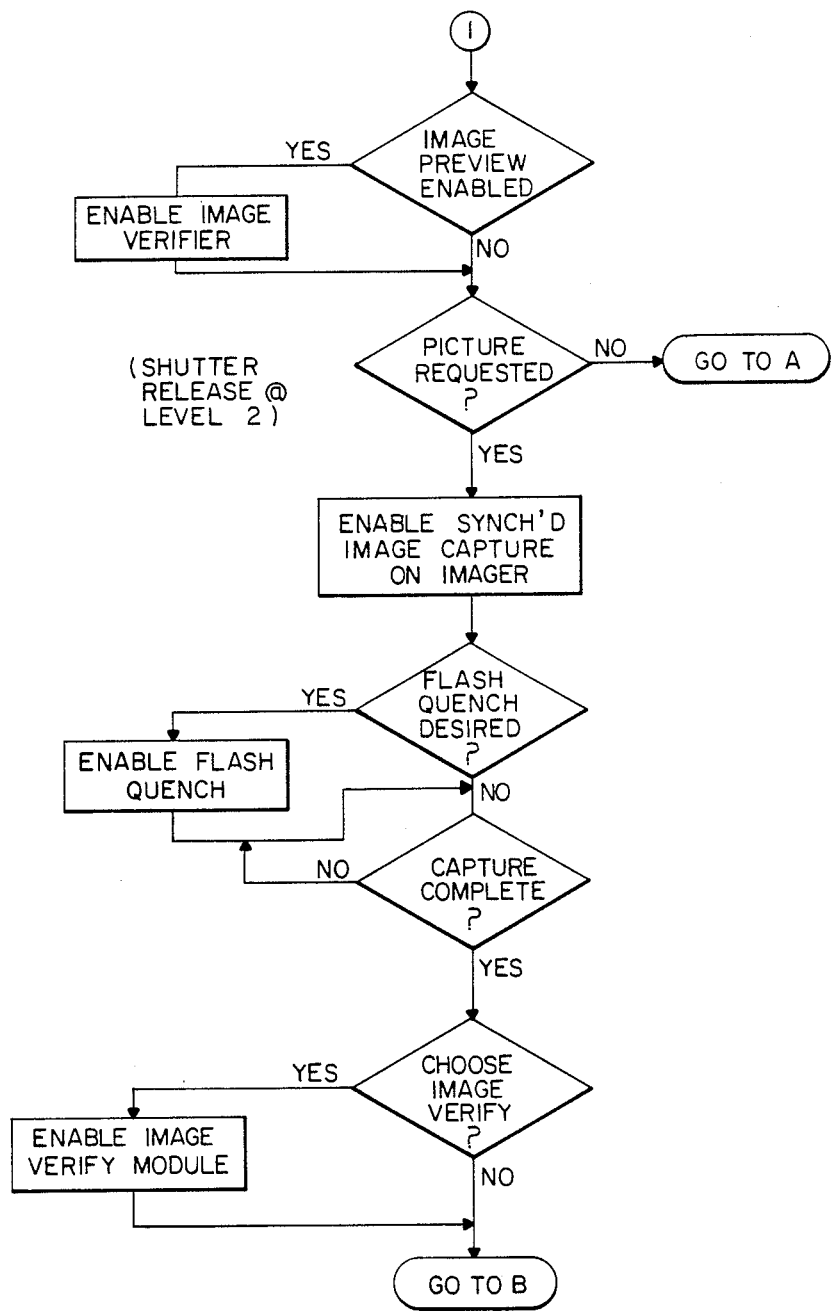

A flow chart in FIGS. 7a and 7b shows the sequence of operations performed in capturing an image electronically and on film. A block diagram of the electronic elements of camera 10 is shown in FIG. 5. A power-on switch 55 is closed to initialize the circuitry shown in FIG. 5. A system controller 56 then conveys an enable signal to the image sensor driver 46 which effects the removal of the off-state charge, or dark current, from the image sensor 40 to prepare the sensor for the capture of an image. Image sensor driver 46, which includes an image sensor timing control and voltage translators, functions in a known manner to provide clock signals to sensor 40. The system controller 56 and the image sensor timing control in driver 46 can each be a Signetics programmable logic sequencer, Model PLS105AN.

When the image sensor 40 is ready for the capture of an image, an operator can start an exposure sequence by the actuation of a shutter release 54. When the shutter release 54 is moved to level 1, a preshoot phase is started. In a first step, the system controller 56 conveys an enable signal and a time-varying exposure duration signal to the image sensor driver 46. The image sensor timing control in driver 46 sends the requisite clocking signals to the image sensor 40 for the capture and subsequent readout of the charge signals. The charge signals from sensor 40 are processed in a well-known manner by a CCD preamp and signal processing circuit 60.

Figure 6:
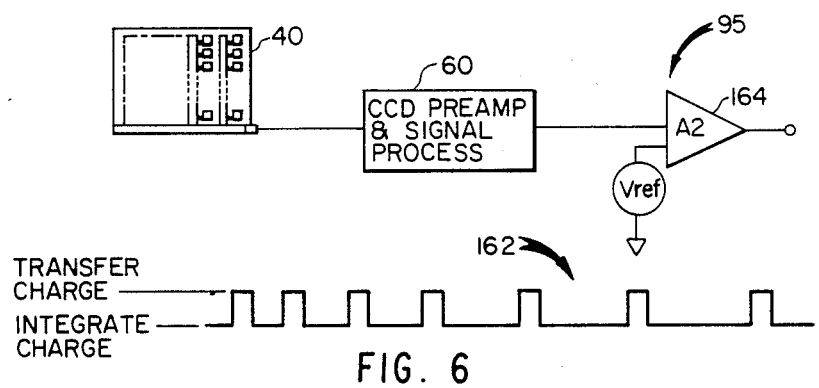
FIG. 6 is a schematic illustration of the flash quench device in the camera.

In order to determine the proper exposure duration, or integration time, of the image sensor 40, signals from circuit 60 are compared to a reference voltage. The procedure which is used to find the proper exposure duration is generally the same as the procedure used to determine when to quench the flash; the flash quench circuit is illustrated in FIG. 6 and described hereinafter. A variable clock-out rate, as shown in waveform 162 in FIG. 6, is used in which the integration time increases for each successive pixel. The signal level is compared to the level of a reference voltage by means of a circuit such as comparator 164 shown in FIG. 6. When the two signals are equal, the exposure duration is registered, and a signal representing this exposure duration is conveyed back to the system controller 56. Typically, the exposure duration selected is that duration that results in the average signal being one-half of the dynamic range available.

Upon receipt of the selected exposure duration, the system controller 56 sends a second enable signal and a signal indicative of the selected exposure duration to the image sensor driver 46. The system controller 56 also enables a light meter logic circuit 90, an autofocus module 91, and an illuminant discriminator logic circuit 92. The charge signals from sensor 40 are amplified in signal processing circuit 60, and the amplified signals are passed to a sample and hold which tracks the reset level of sensor 40 and measures the voltage difference due to the charge signals. The voltage differences representing the image are further amplified and adjusted to a DC reference voltage level in signal processing circuit 60 in order to take maximum advantage of the range of an A/D converter 68 which receives the signals from circuit 60. The digitized signals from A/D converter 68 are stored in a memory 80 which can be, for example, a RAM (Random Access Memory) which is adapted to store at least 1 frame of data. The A/D converter 68 can be a Samsung A/D converter, No. KVA3100A, and memory 80 can be a Motorola RAM, No. MCM511002.

Autofocus module 91 can process data from the CCD preamp and signal processing circuit 60 as disclosed in commonly assigned U.S. Pat. No. 4,490,037, granted Dec. 25, 1984, in the name of Anagnostopoulos et al. In order to find the scene parameter of subject distance, a beam from an LED (not shown) in camera 10 is projected onto a subject in a scene to illuminate a small area thereon. The scene is imaged on image sensor 40, and the signals produced by a row of photodiodes 53 in sensor 40 are analyzed to determine the position of the illuminated small area in the scene; a signal, which represents the subject distance, is then delivered to focus driver 97 and to a camera exposure controller 96.

Light meter logic circuit 90 is adapted to determine the best exposure for the subject in the image. A description of a light meter device suitable for use in the present invention can be found in commonly-owned U.S. Pat. No. 3,714,442, entitled "Exposure Control Circuitry", granted on Jan. 30, 1973, in the name of Lee F. Frank. In the light meter device disclosed therein, each detector in an array of detectors is responsive to radiation derived from a different area of an image, and this information is processed to achieve an optimum light value.

Illuminant discriminator logic circuit 92 can function as disclosed in commonly assigned U.S. patent application Ser. No. 149,322, entitled "Illuminant Discriminator Designed for Easy Integration", filed on Jan. 28, 1988, in the name of Michael J. Gaboury. As disclosed therein, apparatus is provided for discriminating among various types of illuminants such as fluorescent light, tungsten light and natural daylight. The apparatus includes an analog portion which converts incident light into a conditioned illuminant signal and a digital portion which utilizes a microprocessor to perform a Fourier series analysis on one or more of the harmonics of the illuminant signal. The microprocessor then compares the amplitudes of the harmonics against the amplitudes oF known illuminant sources to identify the source. In the present invention, the teachings of the Gaboury application are incorporated in illuminant discriminator logic 92 which directs ALU 93 to perform the harmonic summations and comparisons necessary to identify the illuminant source.

Signals produced by the light meter logic circuit 90, illuminant discriminator logic circuit 92 and autofocus module 91 are provided as inputs to the exposure controller 96. Exposure controller 96 processes these inputs to produce an optimum exposure as described, for example, in commonly-assigned U.S. Pat. No. 4,785,323, granted on Nov. 15, 1988, in the name of C. S. Bell. As disclosed in this patent application, the exposure controller is adapted to maximize overall picture quality. The inputs from circuits 90 and 92 and from module 91 can be used by controller 96 to achieve synergistic effects in the image, such as an improvement in image quality as a result of choosing a light level and illuminant that corresponds with an x and y position of the subject chosen by the autofocus. Exposure controller 96 can also select other camera modules, for example, a module (not shown) for charging the flash.

In the event it is desired to preview the image captured, the recorded image can be viewed on display 50. When it is desired to display an image stored in memory 80, the system controller 56 enables an image verifier module which includes a D/A converter 100. D/A converter 100 delivers an analog signal to a converter 102 which converts the data to a format compatible with the requirements of the image display circuits, typically baseband video. Signals from converter 102 drive the display 50 to form an image of the scene just captured electronically. The display 50 can be viewed in the preview mode in the viewfinder 24, as described above and shown in FIG. 1. The duration of the image display enable may be preset in the system controller 56 or made adjustable by the photographer. If no preview is desired, a simultaneous recording of an image on film 32 and image sensor 40 can be effected by depressing the shutter release 54 to level 2.

When the shutter release 54 is depressed to level 2, the actual exposure on film is initiated. Using the exposure values determined during the preshoot phase, the camera diaphragm/shutter 34 begins the exposure. The system controller 56 receives a start signal from the shutter driver 94 and effects the capture, simultaneously, of an image on film 32 and on the image sensor 40. Registers in autofocus module 91 which capture autofocus data may be accessed during the exposure so that accurate focus on the subject is maintained throughout. Registers in flash quench circuit 95 may also be accessed during the exposure.

An example of a flash quench 95 which can be used in the camera of the present invention is shown in FIG. 6. The arrangement shown in FIG. 6 would replace a conventional flash quench circuit of the type which includes an integration/log circuit. The image sensor 40, indicated diagrammatically in FIG. 6, can be be used with a variable clock-out rate in which the integration time is increased as shown by the waveform 162. In this manner, the integration is achieved in each photosite and simply compared, by means of a comparator 164, to a desired signal level indicated by $V_{ref}$. When a pixel meets or exceeds the level of $V_{ref}$, a signal is delivered to flash driver 99 (FIG. 5) and the flash (not shown) is quenched.

Upon completion of the picture exposure, the image is processed, digitized and stored in the memory 80. In the event the operator wishes to verify the image which was simultaneously recorded electronically and on film 32, the electronic image can be displayed as described above for the preview mode. Thus, an image of the scene just captured on the film can be quickly made available to the photographer.

The invention has been described in detail with particular reference to the preferred embodiments thereof, but it will be understood that variations and modifications can be effected within the spirit and scope of the invention. For example, although the present invention has been described herein with reference to a single lens reflex camera, it will be apparent to those skilled in the art that the invention could be used with other types of cameras. The invention could be used in a camera having a viewfinder which functions with optical elements which are independent from the optical elements which form the image on the film and the sensor. Also, the display for the electronic image could be a separate element, and the camera could include a cable connection for transferring an image signal to a remote display.

I claim:

1. A camera of the single lens reflex type, said camera comprising:
    means for forming an image on photographic film, said forming means including optical means for producing an image of an object to be photographed;
    means for producing an electronic image signal, said producing means including means for sensing scene parameters and for controlling said forming means in accordance with values of said parameters, said sensing and controlling means including means for focussing said optical means and for controlling the exposure of said film;
    display means for receiving said image signal and for producing an image therefrom; and
    a viewfinder for viewing said object and for viewing an image on said display means, said viewfinder being optically coupled to said optical means by means of a reflecting surface.

2. A camera, as defined in claim 1, wherein said producing means includes a solid-state image sensor.

3. A camera, as defined in claim 2, wherein said producing means includes image storage means.

4. A camera, as defined in claim 3, wherein said producing means includes a system controller for controlling the functions of said camera in timed sequence.

5. A camera comprising:
   optical means including at least two lens elements for forming an image of an object to be photographed, said optical means including a beam splitter located between said lens elements for directing a first portion of light entering said optical means to a first location and the remainder of said light to a second location, said optical means further including light control means for controlling the amount of light which is directed to said locations in response to a signal indicative of ambient light;
   means for supporting a photographic film in one of said locations, said supporting means being located in an image plane of said optical means;
   a solid-state image sensor disposed in the other of said locations to receive light from said optical means, said solid-state image sensor including means for generating said signal;
   display means for displaying an image sensed by said solid-state image sensor; and
   a viewfinder which includes means for viewing said object and said display means.

6. A camera, as defined in claim 5, wherein said camera is a single lens reflex camera, and said viewfinder is optically coupled to said optical means by means of a reflecting surface.

7. A camera, as defined in claim 6, wherein said viewfinder includes means for viewing an image selectively formed on said display means.

8. A camera, as defined in claim 6, wherein said viewfinder contains means for selectively viewing an image formed by said optical means or an image formed by said display means.

9. A camera, as defined in claim 8, wherein said camera includes means for simultaneously forming an electronic image and a photographic image.

10. A camera comprising:
    means for forming an image on photographic film; and
    means for producing an electronic image signal, said producing means including means for sensing scene parameters and for controlling said forming means in accordance with values of said parameters, said sensing and controlling means including means for controlling a flash device.

* * * * *